(12) United States Patent
Baldeosingh et al.

(10) Patent No.: US 8,662,260 B2
(45) Date of Patent: Mar. 4, 2014

(54) BALL RAMP CALIPER BRAKE

(75) Inventors: Howard H. Baldeosingh, Stevensville, MI (US); LynRoy Palmer-Coleman, Stevensville, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 85 days.

(21) Appl. No.: 13/157,678

(22) Filed: Jun. 10, 2011

(65) Prior Publication Data
US 2012/0312644 A1    Dec. 13, 2012

(51) Int. Cl.
F16D 55/18    (2006.01)

(52) U.S. Cl.
USPC ........................................ 188/72.7; 188/72.9

(58) Field of Classification Search
USPC ................................. 188/72.6–72.9
See application file for complete search history.

(56) References Cited

U.S. PATENT DOCUMENTS

| | | | | |
|---|---|---|---|---|
| 3,980,159 A | * | 9/1976 | Baxendale | 188/72.7 |
| 4,114,732 A | * | 9/1978 | Dunn | 188/73.2 |
| 4,454,933 A | * | 6/1984 | Hunnicutt et al. | 188/71.9 |
| 5,038,895 A | * | 8/1991 | Evans | 188/72.7 |
| 5,203,434 A | * | 4/1993 | Teeter et al. | 188/70 R |
| 5,529,150 A | * | 6/1996 | Buckley et al. | 188/72.9 |
| 6,112,864 A | * | 9/2000 | Suzuki et al. | 188/158 |
| 6,394,236 B1 | * | 5/2002 | Matsuishita | 188/72.7 |
| 7,040,462 B2 | | 5/2006 | Dennis et al. | |
| 2006/0086575 A1 | * | 4/2006 | Niehorster | 188/71.9 |

* cited by examiner

Primary Examiner — Christopher Schwartz
(74) Attorney, Agent, or Firm — Renner, Kenner, Greive, Bobak, Taylor & Weber (57) ABSTRACT

A caliper brake including a housing and a rotating actuator received in a bore in the housing, the rotating actuator having a head positioned within the housing and an outer tapered surface located outside the housing. A lever includes a bore with an inner tapered surface that mates with the outer tapered surface of the rotating actuator. A threaded nut is received over a threaded end portion of the rotating actuate and applies pressure to the lever to rotationally secure it to the rotating actuator. An inner stator is positioned adjacent to the head of the rotating actuator and an outer stator is spaced from the inner stator, the stators being axially movable. A plurality of ramped depressions are provided in both the head and in a backing plate of the inner stator, and a ball is positioned between each of the ramped depressions.

21 Claims, 7 Drawing Sheets

BALL RAMP CALIPER BRAKE

TECHNICAL FIELD

This invention relates to a ball ramp actuated caliper brake. More particularly, this invention relates to such a caliper brake that includes balls positioned between a rotating actuator and a backing plate of a stator.

BACKGROUND ART

Many vehicles require a parking brake that provides high braking torque while requiring minimal effort by a user. These vehicles are typically heavier vehicles, such as, for example, construction vehicles, agricultural vehicles, utility vehicles, and golf care turf care machines. One type of parking brake often used on such vehicles is a caliper brake, where opposing calipers have a gap therebetween and apply a braking force to a rotating rotor positioned in the gap. These caliper brakes can be mounted at the wheel of a vehicle, or alternatively can be mounted elsewhere in the drive train of the vehicle. A number of mechanisms can be used to actuate the caliper brake, including a ball ramp actuation mechanism, which is often preferred because it is relatively simple in design, reliable, and easy to service and operate. However, known ball ramp actuation mechanisms for caliper brakes suffer from a number of disadvantages generally and specifically in high torque applications.

In high torque parking brakes of heavy vehicles, the input force supplied to the manually activated brake actuation mechanism is limited by the capabilities of the human user. Thus, the mechanical advantage provided by the brake is critical in obtaining the necessary braking torque. Nevertheless, conventional caliper brake actuation mechanisms tend to be extremely inefficient, losing from between twenty to seventy percent of the input force to inefficiencies. These inefficiencies are largely a result of friction throughout the brake. Conventional caliper brake ball ramp actuation mechanisms also can be difficult to mount and install on or adjacent to the vehicle wheel. The ball ramp actuation mechanism includes a lever connected to a rotatable actuation mechanism, and the adjustability of the lever position, when installed, is limited by known designs. Lever position is important to allow cables and linkages to be easily secured to the lever to connect the manual input device to the brake.

One method of connecting a lever to a rotatable actuator in a ball ramp actuation mechanism is disclosed in U.S. Pat. No. 7,040,062 ('062 patent). This patent discloses a rotatable actuator and lever that are formed integrally as a single piece. The rotatable actuator includes ramped depressions that receive balls therein, the balls also being received in corresponding ramped depressions formed in a stationary actuator, as is known to those skilled in the art. Thus, the lever position is limited by the ball and depression positions, effectively limiting the lever to as few as three positions during installation. In addition, it is noted that the rotatable actuator of the device disclosed in the '062 patent presses against a washer, which helps to reduce friction slightly, but some friction related inefficiencies remain. While such a brake may be suitable for lower torque applications, such as in relatively light weight vehicles like golf carts, it is not suitable for the high torque applications contemplated by the present invention.

Another method of connecting a lever to a rotatable actuator in a ball ramp actuation mechanism is disclosed in U.S. Pat. No. 5,529,150 ('150 patent). The rotatable actuator and the lever each include splined surfaces that, when engaged, rotationally couple the lever to the rotatable actuator. Like the '062 patent, the rotatable actuator and a stationary actuator each include ramped depressions that receive balls therein, and rotation of the rotatable actuator causes the balls to travel up the ramps, thereby generating axial movement of the rotatable actuator. The splined attachment of the lever to the rotatable actuator offers greater adjustability than the '062 patent device, but is still limited to a finite number of locations. In addition, the spline teeth are a likely point of failure under high loads. It is also noted that manufacturing costs of the splined surfaces are relatively high, and the machining of the ramped ball depressions in the '150 device would be difficult and expensive as well due to their proximity to other components of the brake.

Thus, there is a need for an improved ball ramp caliper brake that alleviates one or more of the above mentioned deficiencies of the prior art.

DISCLOSURE OF THE INVENTION

It is thus an object of one aspect of the present invention to provide a caliper brake with a ball ramp actuation mechanism that provides a high mechanical advantage.

It is an object of another aspect of the present invention to provide a caliper brake, as above, having a lever attachment mechanism that offers greater adjustability during installation.

It is an object of an additional aspect of the present invention to provide a caliper brake, as above, having a lever attachment mechanism that reduces the chances of failure under high load.

It is an object of a further aspect of the present invention to provide a caliper brake, as above, that is easy to manufacture.

These and other objects of the present invention, as well as the advantages thereof over existing prior art forms, which will become apparent from the description to follow, are accomplished by the improvements hereinafter described and claimed.

In general, a caliper brake according to the concepts of the present invention includes a housing and a rotating actuator carried by the housing and having an end surface. An inner stator is positioned adjacent to the end surface of the rotating actuator and includes a backing plate. A plurality of ramped depressions are provided in the end surface of the rotating actuator, and a plurality of ramped depressions are provided in the backing plate of the inner stator on a surface proximate the end surface of the rotating actuator. The ramped depressions of the inner stator are aligned with the ramped depressions of the rotating actuator, and a ball is received in each of the ramped depressions. Rotation of the rotating actuator causes movement of the balls in the ramped depressions and axial movement of the inner stator.

In accordance with another aspect of the present invention, a brake includes a housing, a rotating actuator, and a lever. The rotating actuator is carried by the housing and has a first end positioned outside of the housing and a second end positioned within the housing. The first end of the rotating actuator has a tapered outer surface decreasing in diameter as it extends away from the housing and a threaded portion adjacent to the tapered surface. The lever includes a bore with a tapered inner surface adapted to mate with the tapered surface of said rotating actuator.

In accordance with a further aspect of the present invention, a brake includes a housing having a bore. A recess is provided in the housing adjacent to the bore, the recess including a back surface. A neck of a rotating actuator is received in the bore and a head of the rotating actuator is positioned within the housing. The head of the rotating actuator has an increased diameter relative to the neck, with the intersection of the head and the neck forming a shoulder surface that is generally parallel to the back surface of the recess. A needle thrust bearing is positioned between the shoulder surface and the back surface, the bearing acting to reduce friction during rotation of the rotating actuator.

In accordance with yet another aspect of the present invention, a brake includes a housing having a bore in one side. A rotating actuator has a head with an end surface positioned within the housing and a neck received in the bore in the housing. The neck includes a tapered outer surface positioned outside of the housing and a threaded portion on a distal end of the neck opposite the head. An inner stator is positioned adjacent to the end surface and has a backing plate. A plurality of ramped depressions are provided in the end surface of the rotating actuator and a plurality of ramped depressions are provided in the backing plate of the inner stator on a surface proximate the end surface of the rotating actuator. The ramped depressions of the inner stator are aligned with the ramped depressions of the rotating actuator. A ball is received in each of the ramped depressions, wherein rotation of the rotating actuator causes movement of the balls in the ramped depressions and axial movement of the inner stator. A lever is provided and has a bore with a tapered inner surface adapted to mate with the tapered surface of the rotating actuator. A needle thrust bearing is positioned between the head and the housing around the bore in the housing.

A preferred exemplary caliper brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A caliper brake made in accordance with the present invention is indicated generally by the numeral 10. Caliper brake 10 includes a housing 12 having a first portion 14 and a second portion 16. A bridge 18 connects the first portion 14 and the second portion 16 along the top edges thereof. Thus, housing 12 is generally U-shaped and includes an opening 20 between first portion 14 and second portion 16. A rotating rotor (not shown) of a vehicle is received within opening 20, the brake 10 acting upon the rotor to prevent movement of a vehicle.

Housing 12 acts to enclose and support the components of caliper brake 10, and also provides a mounting mechanism for securing the brake 10 to a vehicle. A mounting bracket 21 includes holes 22 adapted to receive mounting bolts (not shown) therethrough. The mounting bolts secure the brake 10 to a mounting surface. While brake 10 may be mounted to any surface so as to position it over a rotatable rotor, it is contemplated that caliper brake 10 may be secured to a mounting surface located adjacent to a wheel of the vehicle, or, alternatively, may be secured on an axle or transmission of the vehicle. In any case, braking forces acting on the rotor prevent rotation, and thereby prevent movement of the vehicle.

Second portion 16 of housing 12 includes a projection 26 having a bore 28 therein that provides access to opening 20 within housing 12. A neck 33 of a rotating actuator 30 is received in bore 28, with a first end 31 of the rotating actuator exposed on the exterior of housing 12, and a second end 32 of the rotating actuator positioned within the opening 20 of housing 12. Bore 28 and at least the neck 33 of rotating actuator 30 positioned therein are generally cylindrical in shape to allow the rotating actuator 30 to rotate within the bore 28. To facilitate such rotation and reduce friction, a bushing 34 is provided within bore 28 and around the neck 33 of rotating actuator 30.

Rotating actuator 30 includes a head 36 at the second end 32, the head having an increased diameter relative to the neck 33. Head 36 is generally cylindrical in shape, and includes an end surface 37 that is generally planar and perpendicular to an axis of rotation of neck 33. A shoulder 38 is formed at the transition from the neck to the head, the shoulder having a surface that is generally perpendicular to the axis of rotation of the neck 33. A recess 40 is provided in the inner surface of the second portion 16 of housing 12 that is adapted to receive head 36. Recess 40 includes an outer radial surface 42 extending generally parallel to the axis of rotation of neck 33, and a back surface 44 generally parallel to shoulder 38. While a particular embodiment of recess 40, projection 26, and rotating actuator 30 are described herein, it will be appreciated that both may vary in size and shape without deviating from the scope of the present invention.

In certain embodiments of the invention, a thrust needle bearing 48 may be provided between shoulder 38 of rotating actuator 30 and back surface 44 of recess 40. Thrust needle bearings are generally flat and provide a plurality of rollers spaced radially about a central bore. As will be appreciated by those skilled in the art, thrust needle bearing 48 reduces the friction as rotating actuator 30 rotates relative to housing 12, thereby increasing the mechanical advantage of brake 10. Thrust needle bearing 48 may be any such needle bearing known in the art and sized to fit within recess 40.

A seal or gasket 50 may also be provided between neck 33 of rotating actuator 30 and bore 28 to prevent dirt and moisture from entering bore 28 from outside brake 10. Similarly, a second seal or gasket 52 may be provided between shoulder 38 of head 36 and back wall 44 of recess 40 to prevent dirt and moisture from entering bore 28 from the interior of brake 10.

Figure 6:
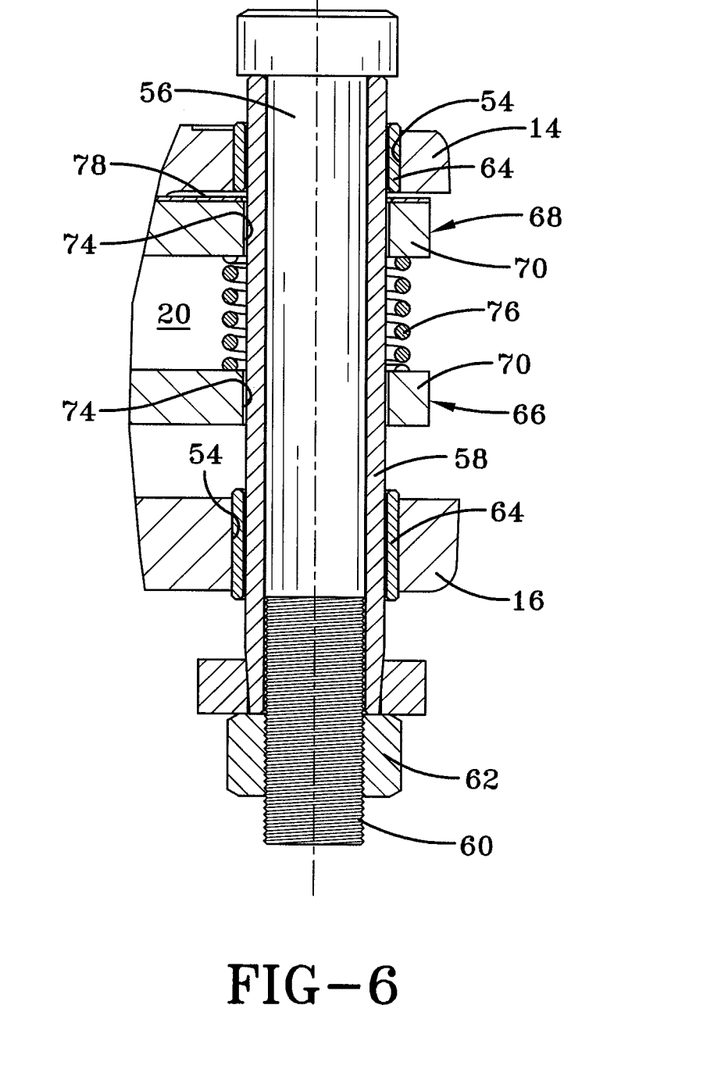
FIG. 6 is a sectional view of the caliper brake taken substantially along line 6-6 of FIG. 3 showing a mounting bolt and mounting sleeve.

Holes 54 are provided in housing 12 for receiving mounting bolts 56 and mounting sleeves 58 (see FIG. 6). The mounting bolts 56 secure the housing 12 to the mounting bracket 21 and also carry a number of brake components thereon, as will be discussed below. A pair of aligned holes 54 through first and second portions 14, 16 is provided at opposing ends of housing 12, each pair of holes receiving a single mounting bolt 56 and mounting sleeve 58. Locating holes 54 at spaced locations at the ends of housing 12 provides stability and resists moment forces action on brake 10. Holes 54 are positioned in first portion 14 and second portion 16 of housing 12 so that mounting bolts 56 and mounting sleeves 58 span the opening 20 provided within housing 12. Each mounting bolt 56 is longer than the distance between the outer surfaces of housing 12, and mounting sleeves 58 are likewise oversized, thereby allowing housing 12 to slide axially along the mounting sleeves 58 to be aligned over the rotor. Mounting sleeves 58 are generally cylindrical and hollow, and are sized to fit over mounting bolts 56. Each mounting bolt 56 includes a threaded end 60 that receives a nut 62 thereon, the nut having internal threads adapted to mate with the threaded end 60 of mounting bolt 56. As will be appreciated by those skilled in the art, nuts 62 retain mounting sleeves 58 on mounting bolts 56, and also retain housing 12 on mounting sleeves 58. A bushing 64 may be provided in each hole 54 to facilitate movement of housing 12 on mounting sleeves 58.

Figure 1:
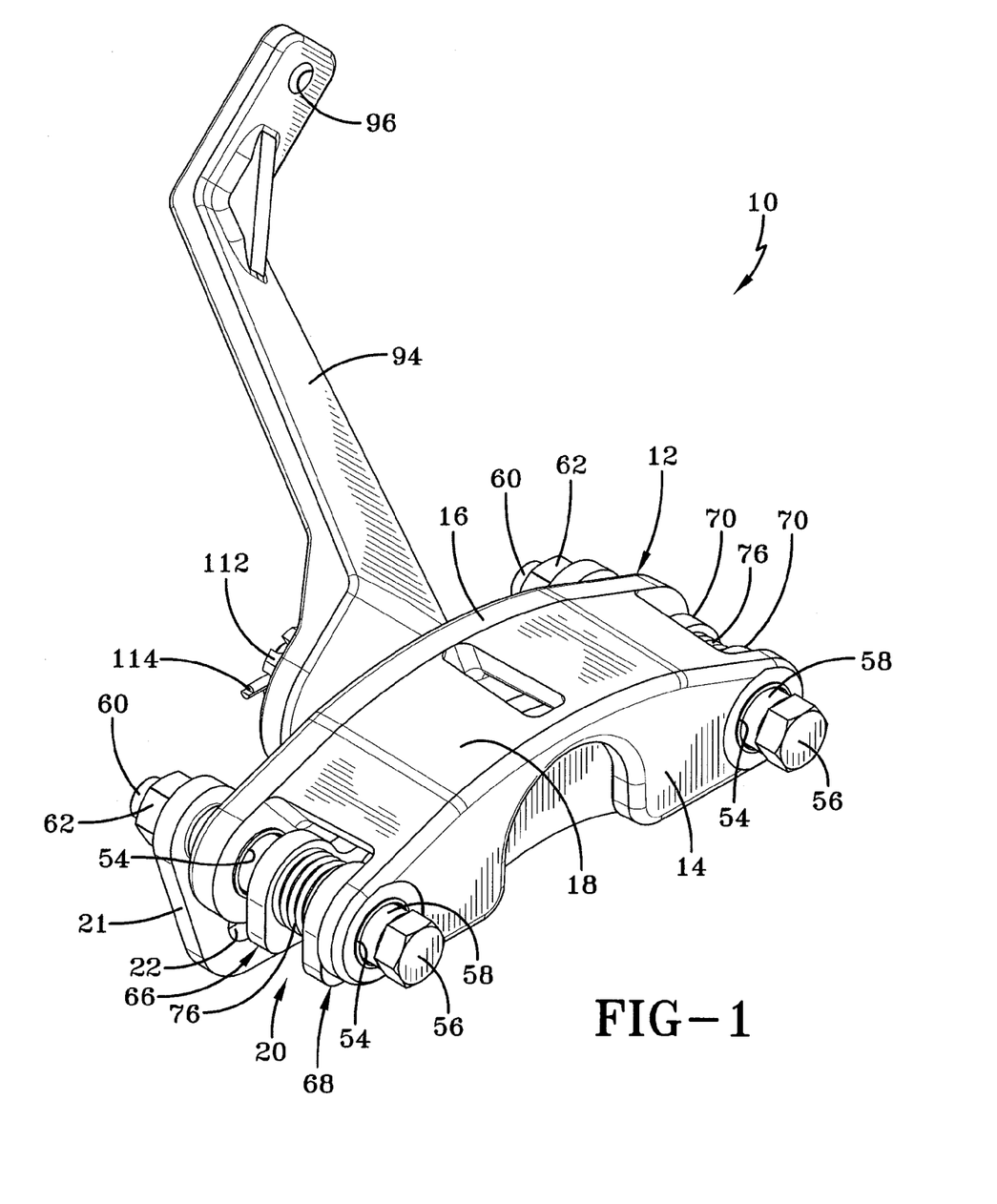
FIG. 1 is a top, front, right side perspective view of a caliper brake according to the concepts of the present invention.
Figure 2:
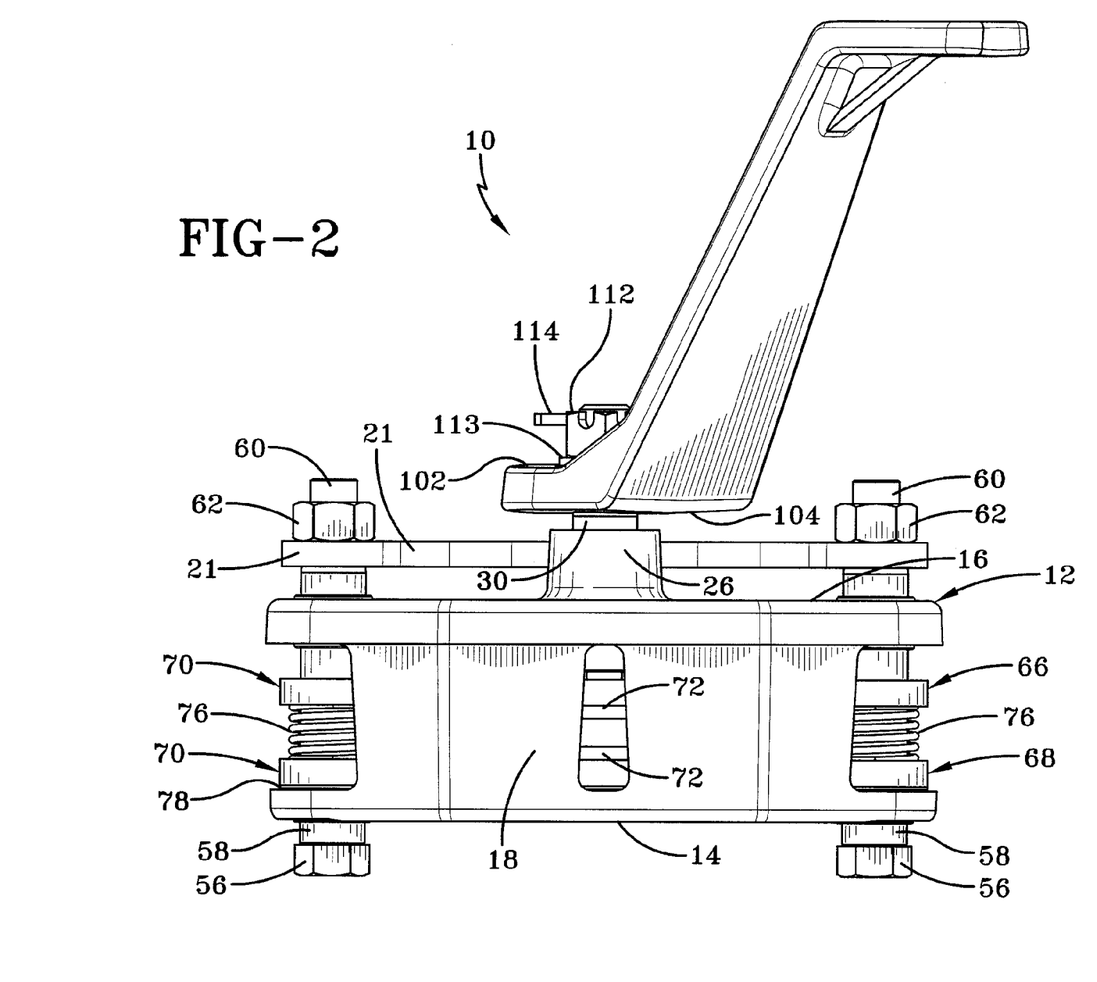
FIG. 2 is a top plan view of the caliper brake of FIG. 1.
Figure 3:
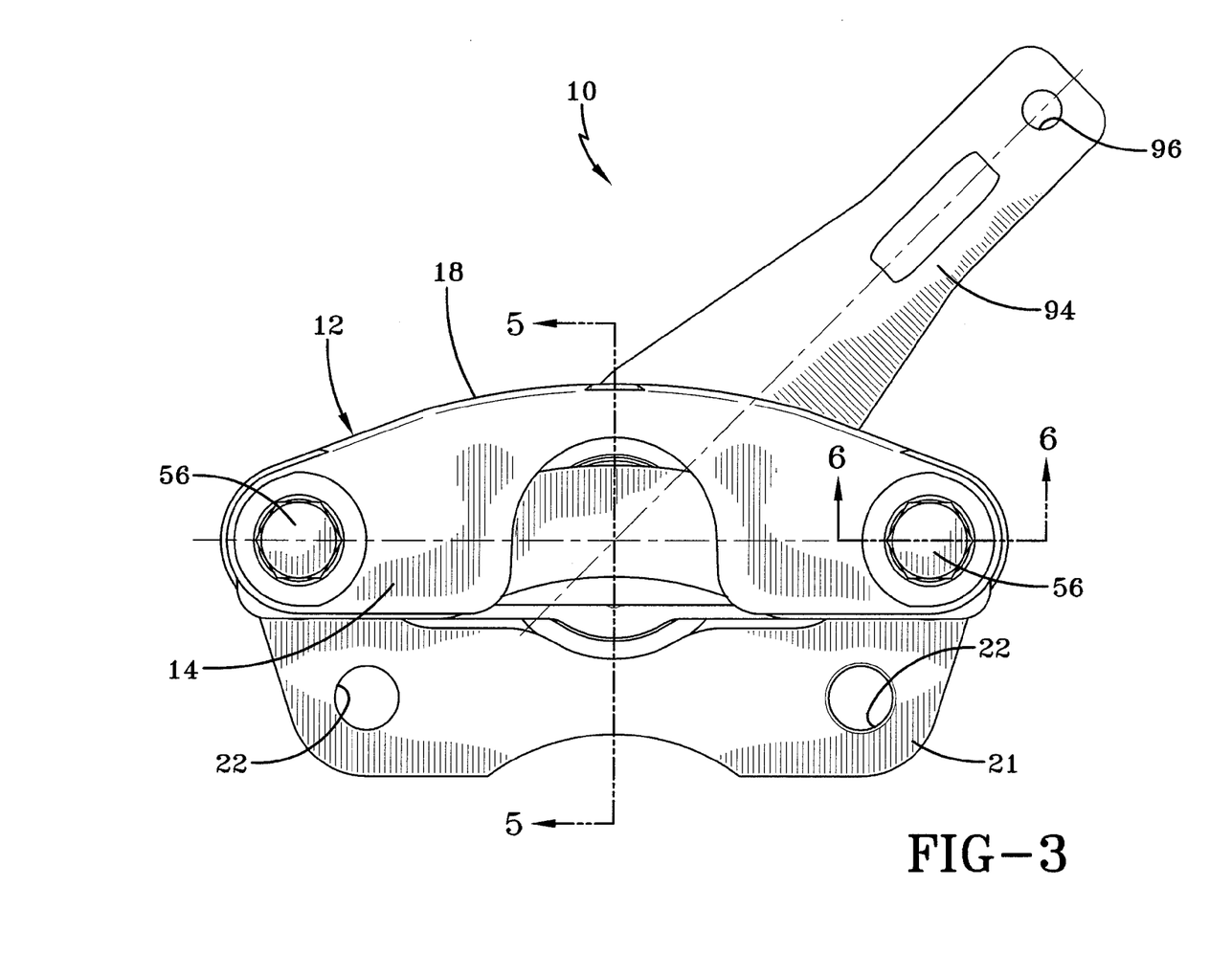
FIG. 3 is a front elevational view of the caliper brake of FIG. 1.
Figure 4:
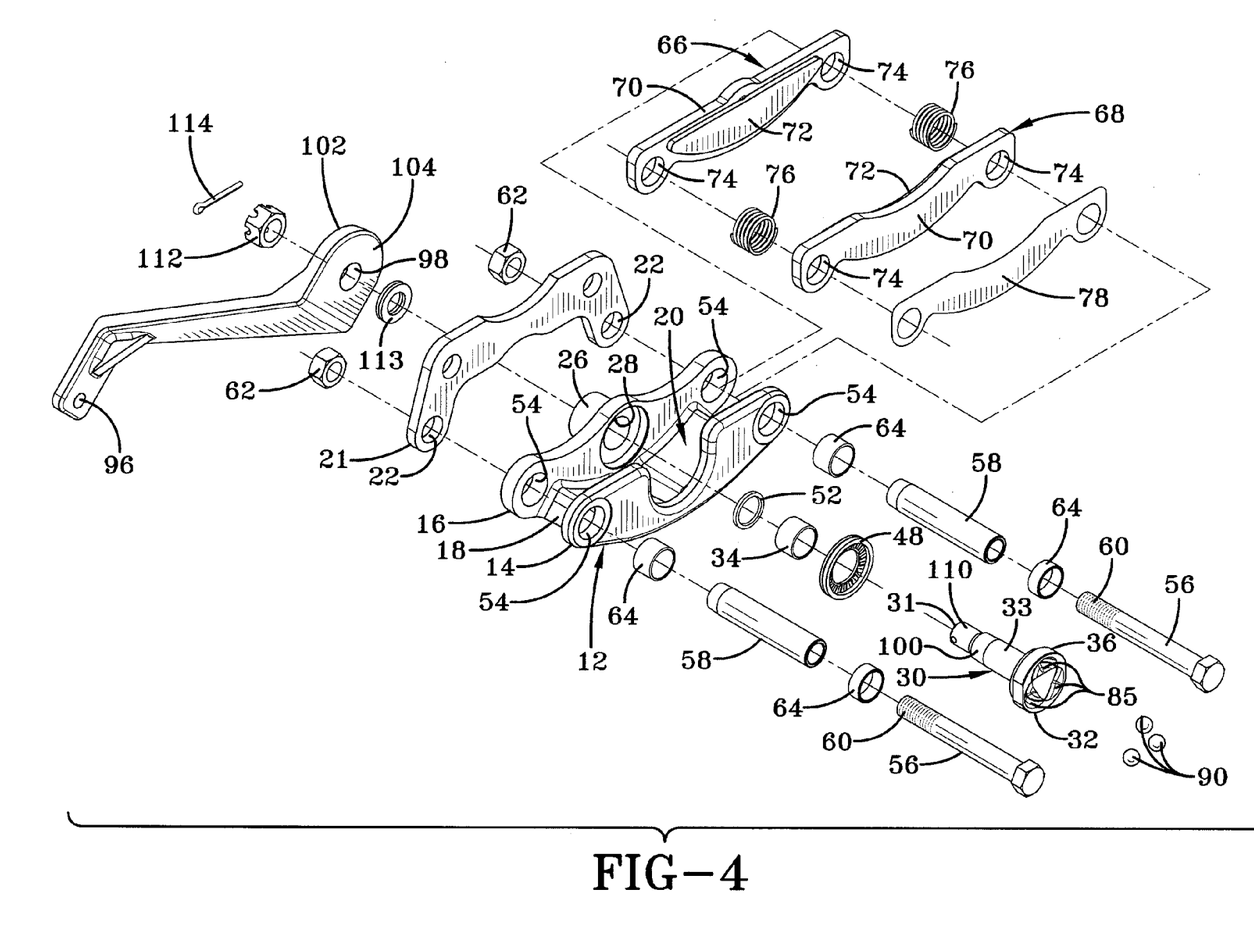
FIG. 4 is an exploded view of the components of the caliper brake of FIG. 1.
Figures 7, 8:
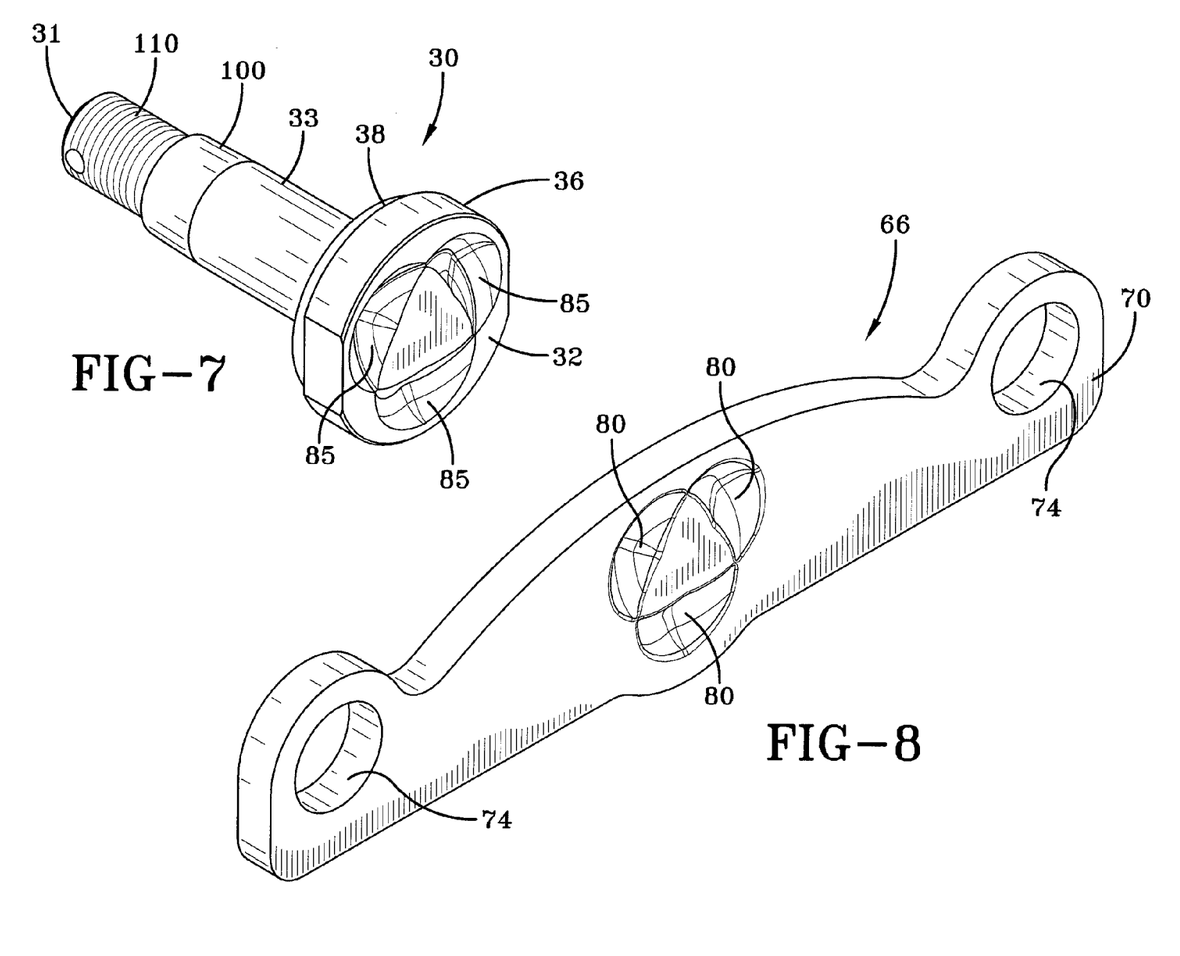
FIG. 7 is a perspective view of a rotating actuator according to the concepts of the present invention.
FIG. 8 is a perspective view of a stator plate having stamped depressions according to the concepts of the present invention.

An inner stator 66 and an outer stator 68 are carried by mounting sleeves 58 between first portion 14 and second portion 16 of housing 12. Each stator includes a backing plate 70 and a liner 72 located on one side of backing plate 70. Liners 72 are made of a material with sufficient frictional and heat resistant properties to withstand repeated braking operations, such as, for example, sintered bronze, organic compounds, and sintered iron. Each backing plate 70 includes spaced mounting holes 74 on opposing ends that receive mounting sleeves 58 therethrough (FIGS. 4, 6, and 8). As will be appreciated by those skilled in the art, stators 66 and 68 are axially movable along mounting sleeves 58. Mounting holes 74 are sized to have a diameter just larger than the outer diameter of mounting sleeves 58, thereby allowing axial movement without allowing significant misalignment of brake components.

Inner stator 66 is oriented so that the liner 72 thereon faces first portion 14 of housing 12, and outer stator 68 is oriented so that the liner 72 thereon faces second portion 16 of housing 12. Thus, when moved toward one another, stators 66 and 68 engage the rotor and prevent rotation thereof. A spring 76 is positioned over each mounting sleeve 58 between the backing plates 70 of inner and outer stators 66 and 68 to bias the stators in an un-actuated position, and to maintain pressure between inner stator 66 and head 36 of rotatable actuator 30, as will be discussed below. Outer stator 68 is positioned adjacent to an inner surface of first portion 14 of housing 12. One or more shims 78 may be positioned between outer stator 68 and the first portion of the housing 14 to adjust the position of the stators 66 and 68. Shims 78 may have a shape similar to the shape of the backing plate 70 of the stators, and include mounting holes that receive the mounting sleeve therethrough.

Backing plate 70 of inner stator 66 includes a plurality of ramped depressions 80 in a surface opposite liner 72, as best shown in FIG. 8. Depressions 80 are arranged in a circular pattern on backing plate 70. In the embodiment shown, three depressions are provided and are spaced approximately 120° apart. The ramped depressions 80 decrease in depth progressively as they move away from the center to provide a ramp, and have a radius across their width to facilitate detainment of a spherical ball. While three depressions 80 are shown, it is contemplated that more than three ramped depressions may be provided in backing plate 70.

Similarly, end surface 37 of rotating actuator 30 includes a plurality of ramped depressions 85, as best shown in FIG. 7. Depressions 85 are arranged in a circular pattern mirroring those of backing plate 70. In the embodiment shown, three depressions are provided and are spaced approximately 120° apart. The ramped depressions 85 decrease in depth progressively as they move circumferentially away from the center to provide a ramp, and have a radius across their width to facilitate detainment of a spherical ball. While three depressions 85 are shown, it is contemplated that more than three or less than three ramped depressions may be provided in end surface 37, so long as the number of ramped depressions is equal to the number provided in backing plate 70.

Figure 5:
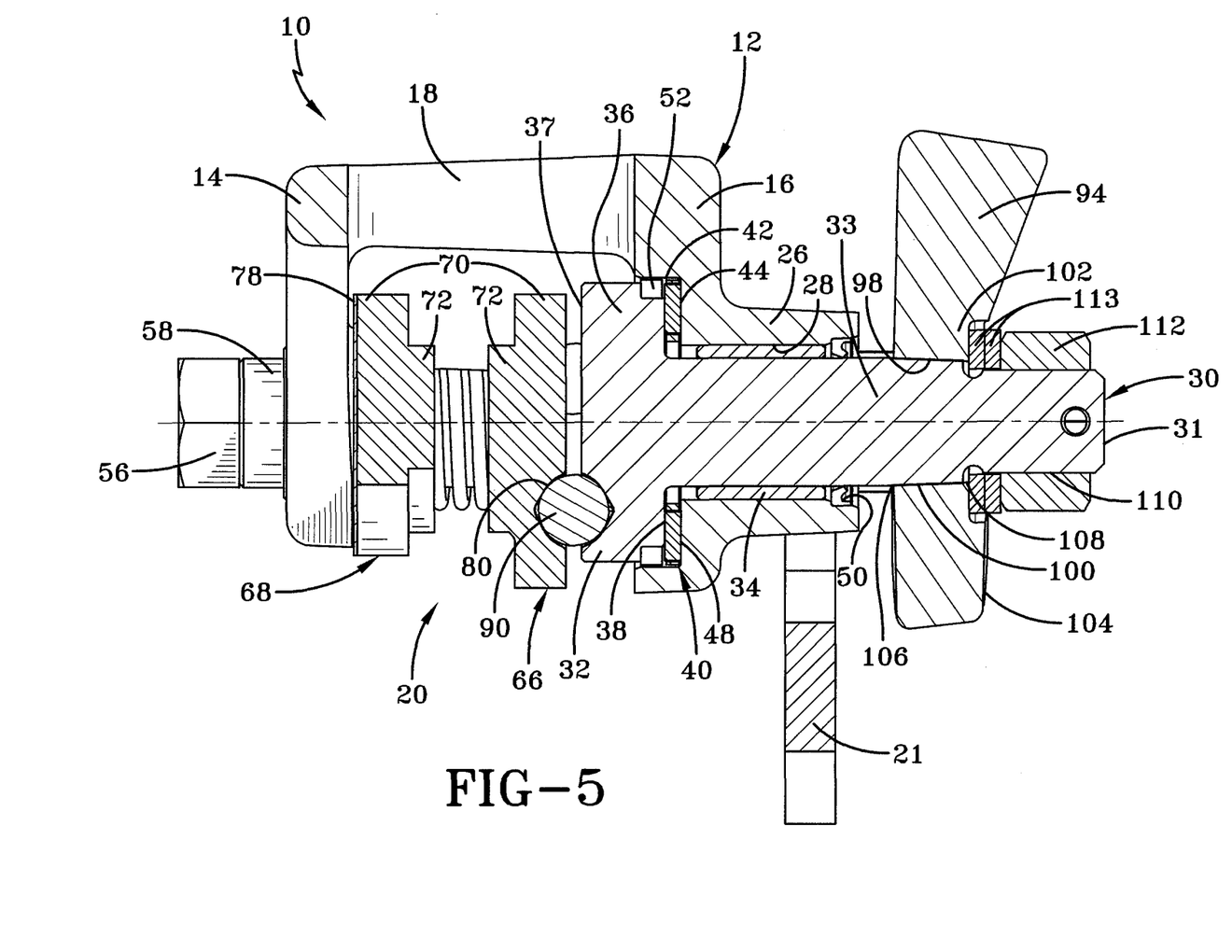
FIG. 5 is a sectional view of the caliper brake taken substantially along line 5-5 of FIG. 3 showing the rotating actuator.

Each center of a ramped depression in end surface 37 is aligned with a center of a ramped depression in backing plate 70 when rotating actuator 30 is in an un-actuated position, and a ball 90 (FIG. 5) is positioned between the aligned ramped depressions. As rotating actuator 30 rotates, balls 90 simultaneously move up the ramps of the depressions to create an axial force acting on inner stator 66. Inner stator 66 is prevented from rotating relative to end surface 37 by mounting sleeves 58, which allows the balls 90 to roll up the ramped depressions 80. In this way a small amount of rotation of rotating actuator 30 can create significant axial movement of inner stator 66. As will be appreciated by those skilled in the art, movement of inner stator 66 toward outer stator 68 applies a braking force to a rotor.

Rotation of rotating actuator 30 is caused by rotational movement of a lever 94 secured to the neck 33 near first end 31. Lever 94 includes an aperture 96 at a distal end that may be utilized to connect the lever to a cable or linkage secured at an opposite end to an input mechanism. The input mechanism may be a lever adapted to be pulled by a user's hand, a pedal adapted to be pressed by a user's foot, or other suitable mechanisms that transfer forces through a cable or linkage system to the lever 94. Lever 94 may be provided with any desired shape or configuration in order to accommodate other design parameters and space constraints.

Lever 94 includes a tapered bore 98 at an end opposite aperture 96. Tapered bore 98 is received on a tapered surface 100 of rotating actuator 30 at first end 31. Tapered bore 98 increases in diameter from an outer surface 102 of lever 94 to an inner surface 104 of lever 94. In certain embodiments the angle of taper of tapered bore 98 may be between 1° and 5°. Similarly, tapered surface 100 decreases in diameter as it approaches the first end 31 of the rotating actuator 30. In certain embodiments, lever 94 may be provided with an increased thickness to allow for greater contact between tapered bore 98 and tapered surface 100. The angle of taper of tapered surface 100 is approximately equal to the angle of taper of tapered bore 98. Thus, as will be appreciated by those skilled in the art, lever 94 is installed over rotating actuator 30 by positioning tapered surface 100 within tapered bore 98.

Rotating actuator 30 also includes a threaded end portion 110 that extends from tapered surface 100 toward first end 31. Threaded end portion 110 is generally cylindrical and includes threads on an outer surface thereof. A castle nut 112 (or other suitable nut) includes corresponding internal threads and is secured over threaded end portion 110. One or more washers 113 may be positioned between castle nut 112 and lever 94 to ensure sufficient pressure is applied to the lever to secure it over the rotating actuator. Tightening of castle nut 112 applies axial pressure to lever 94 to force tapered bore 98 onto tapered surface 100. By virtue of the progressively increasing diameters of each of the tapered bore 98 and tapered surface 100, a secure connection is made between lever 94 and rotating actuator 30 as castle nut 112 is tightened. Thus, lever 94 is rotatably secured to rotating actuator 30 so that movement of the lever caused by an input mechanism creates rotation of rotating actuator 30. A cotter key 114 is used to prevent castle nut 112 from loosening during normal operation of the brake. Notably, infinite adjustability is provided by the attachment mechanism described, including a tapered bore 98 and tapered surface 100.

Manufacturing of the caliper brake 10 is simplified by the positioning of the ramped depressions 80 and 85. Ramped depressions 80 in backing plate 70 can be formed by a stamping process. Stamping, as compared to other methods of machining, is easy and fast, and therefore less expensive. The forming of ramped depressions 80 in backing plate 70 causes protrusions, or bumps, in the opposite surface of the backing plate where liner 72 is located. However, liner 72 covers these protrusions so that they have no impact on brake function. Ramped depressions 85 are formed in end surface 37 of rotating actuator 30 opposite neck 33. Thus, machining of the ramped surfaces 85 is not inhibited by neck 33. As a result, tools used to machine the ramped surfaces do not need to fit within small areas as in prior art designs. The machining of ramped surfaces 85 may therefore be accomplished without significant difficulty.

It is thus evident that a caliper brake constructed as described herein accomplishes the objects of the present invention and otherwise substantially improves the art.

What is claimed is:

1. A caliper brake for activation on a rotor comprising a housing, a rotating actuator carried by said housing and having an end surface, an inner stator positioned adjacent to said end surface and having a backing plate and a liner, a plurality of ramped depressions in said end surface of said rotating actuator, a plurality of ramped depressions in said backing plate of said inner stator on a surface proximate said end surface of said rotating actuator, said ramped depressions of said inner stator being aligned with said ramped depressions of said rotating actuator, and a ball received in each of said ramped depressions, wherein rotation of said rotating actuator causes movement of said balls in said ramped depressions and axial movement of said inner stator, wherein said liner of said inner stator engages the rotor.

2. The caliper brake of claim 1, said rotating actuator including a neck and a head, said head having an increased diameter relative to said neck and being positioned within said housing, the intersection of said head and said neck forming a shoulder generally perpendicular to an axis of rotation of said neck.

3. The caliper brake of claim 2, wherein a seal is provided around said neck of said rotating actuator at an opening of said bore.

4. The caliper brake of claim 2, said housing having a bore that receives said neck of said rotating actuator therein, a bushing being positioned around said neck and within said bore.

5. The caliper brake of claim 4, said housing including a recess adjacent to said bore, said recess being adapted to receive a portion of said head and having a back surface generally parallel to said shoulder.

6. The caliper brake of claim 5, further comprising a needle thrust bearing positioned between said shoulder of said rotating actuator and said back surface of said recess.

7. The caliper brake of claim 1, further comprising a lever secured to a first end of said rotating actuator, said lever acting to rotate said rotating actuator.

8. The caliper brake of claim 7, said first end of said rotating actuator including a tapered outer surface decreasing in diameter as it extends away from said housing and a threaded portion adjacent to said tapered outer surface.

9. The caliper brake of claim 8, said lever having a bore with an inner tapered surface adapted to be received over said tapered outer surface of said rotating actuator.

10. The caliper brake of claim 9, further comprising a threaded nut received on said threaded portion of said rotating actuator, said nut acting to rotationally secure said lever to said rotating actuator by applying an axial force to said lever, thereby pressing said inner tapered surface of said bore against said outer tapered surface of said rotating actuator.

11. The caliper brake of claim 1, wherein three ramped depressions are arranged in a circular pattern in said end surface of said rotating actuator and three ramped surfaces are arranged in a circular pattern in said backing plate of said inner stator.

12. A brake for engaging a rotor comprising a housing, a rotating actuator, an inner stator, a needle thrust bearing, and a lever, said rotating actuator carried by said housing and having a first end positioned outside of said housing and a second end positioned within said housing, said first end of said rotating actuator having a tapered outer surface decreasing in diameter as it extends away from said housing and a threaded portion adjacent to said tapered surface, said lever having a bore with a tapered inner surface adapted to mate with said tapered surface of said rotating actuator, said inner stator having a backing plate and a liner, wherein said backing plate has a plurality of ramped depressions, and wherein said liner of said inner stator engages the rotor.

13. The brake of claim 12, further comprising a threaded nut received over said threaded portion of said rotating actuator, said threaded nut acting to rotationally secure said lever to said rotating actuator when tightened by applying an axial force to said lever, thereby pressing said tapered inner surface of said bore against said tapered outer surface of said rotating actuator.

14. The brake of claim 13, further comprising a cotter key that prevents rotation of said threaded nut.

15. The brake of claim 12, wherein said lever is connected to a mechanism that actuates the brake.

16. The brake of claim 12, further comprising a plurality of ramped depressions in said second end of said rotating actuator and a ball received in each of said ramped depressions.

17. The brake of claim 16, further comprising an inner stator positioned within said housing and adjacent to said second end of said rotating actuator and an outer stator spaced from said inner stator within said housing.

18. The brake of claim 17, further comprising a plurality of ramped depressions in said inner stator facing said ramped depressions in said rotating actuator.

19. A brake for engaging a rotor comprising a housing having a bore and a recess adjacent to said bore, said recess including a back surface; a rotating actuator having a neck received in said bore and a head positioned within said housing, said head having an increased diameter relative to said neck, the intersection of said head and said neck forming a shoulder surface generally parallel to said back surface of said recess; a needle thrust bearing positioned between said shoulder surface and said back surface, said bearing acting to reduce friction during rotation of said rotating actuator; an inner stator having a backing plate and a liner, wherein said backing plate has a plurality of ramped depressions, and wherein said liner of said inner stator engages the rotor; and a lever having a bore with a tapered inner surface adapted to mate with a tapered surface of said rotating actuator.

20. The brake of claim 19, further comprising a plurality of ramped depressions in an end surface of said head and a ball received in each of said ramped depressions.

21. A brake comprising:
a housing having a bore in one side;
a rotating actuator having a head with an end surface positioned within said housing and a neck received in said bore in said housing, said neck including a tapered outer surface positioned outside of said housing and a threaded portion on a distal end of said neck opposite said head;

an inner stator positioned adjacent to said end surface and having a backing plate;

a plurality of ramped depressions in said end surface of said rotating actuator;

a plurality of ramped depressions in said backing plate of said inner stator on a surface proximate said end surface of said rotating actuator, said ramped depressions of said inner stator being aligned with said ramped depressions of said rotating actuator;

a ball received in each of said ramped depressions, wherein rotation of said rotating actuator causes movement of said balls in said ramped depressions and axial movement of said inner stator;

a lever having a bore with a tapered inner surface adapted to mate with said tapered surface of said rotating actuator; and a needle thrust bearing positioned between said head and said housing around said bore in said housing.

* * * * *